(12) United States Patent
Yilmaz

(10) Patent No.: US 6,425,231 B1
(45) Date of Patent: Jul. 30, 2002

(54) MULTIFUNCTIONAL RECYCLING LAWN MOWER

(76) Inventor: Gursel George Yilmaz, 28202 Meadowlark La., Bonita Springs, FL (US) 34134

(*) Notice: Subject to any disclaimer, the term of this patent is extended or adjusted under 35 U.S.C. 154(b) by 0 days.

(21) Appl. No.: 09/741,298

(22) Filed: Dec. 19, 2000

(51) Int. Cl.⁷ .............................. A01D 34/64
(52) U.S. Cl. ........................ 56/14.7; 56/16.7
(58) Field of Search ................. 56/14.7, 14.9, 56/2, 16.7, 17.1, 17.5, 17.4, 320.1, 320.2

(56) References Cited

U.S. PATENT DOCUMENTS

| | | | |
|---|---|---|---|
| 4,326,370 A | * 4/1982 | Thorud | 56/202 |
| 4,951,449 A | * 8/1990 | Thorud | 56/2 |
| 5,355,666 A | * 10/1994 | McDonner et al. | 56/255 |
| 5,921,072 A | * 7/1999 | Cargile | 56/17.5 |
| 6,085,508 A | * 7/2000 | Miatt et al. | 56/17.1 |
| 6,195,969 B1 | * 3/2001 | Yilmaz | 56/14.7 |

* cited by examiner

Primary Examiner—Robert E. Pezzuto

(57) ABSTRACT

Multifunctional recycling mower replaces separate lawn mowers for mulching, side discharge, and bag collection into one multifunctional lawn mower using a single multifunctional shell. The multifunctional recycling lawn mower consists of a multifunctional shell and a rotational blade and a handle. The multifunctional shell is used for in situ recycling and discharge and bag collection of grass and weed clippings. The shell is moved and controlled by using the handle which is connected to the shell. The multifunctional shell functions as a recycling mower when it is set and moved in one direction and functions as a discharge and bag collection mower when it is set and moved in the opposite direction.

14 Claims, 4 Drawing Sheets

MULTIFUNCTIONAL RECYCLING LAWN MOWER

FIELD OF THE INVENTION

The present invention lies in the field of mechanical engineering and more particularly improving landscape lawn mowers.

BACKGROUND OF THE INVENTION

Present invention replaces separate lawn mowers or lawnmower parts for mulching, side discharge, and rear bag collection of grass clippings into one lawn mower. Said multifunctional lawn mower consists of a multifunctional shell and a rotational blade and a handle. Said multifunctional shell is used for in situ recycling and side discharge and bag collection of grass and weed clippings by incorporating variables of rotational direction of said rotational blade and direction of said multifunctional shell. Said multifunctional shell has a front section and an end section and in between has a center preferably under which said rotational blade is connected to said multifunctional shell. Said multifunctional shell is moved and controlled by using said handle which is connected to said shell and functions as a recycling mower when moved in the direction of front section and functions as a discharge and rear bag collection mower when moved in the direction of end section. Prior art reviewed did not show or suggest a single multifunctional shell shaped to operate as a recycling mower and a discharge mower as a function of its direction. Relevant examples of prior art on lawn mowers are summarized below.

U.S. Pat. No. 6,085,508 discloses a mower deck having a cutting chamber including a rotating cutter head disposed within the cutting chamber with the cutter head which is movable so that it can adopt a number of operating position.

U.S. Pat. No. 5,910,091 discloses a cutter housing of an electric lawn mower of a walking type is inclined toward rear and that the battery load is distributed so that the running direction of the electric lawn mower can easily be changed.

U.S. Pat. No. 5,826,414 discloses a cutting device including a power unit and a cutting unit connected a single pivot point. The power unit is preferred to be mounted on drive wheels.

U.S. Pat. No. 5,572,856 discloses a remotely controlled mower which can be easily converted to an edger, a trimmer, and a blower with replaceable kits.

U.S. Pat. No. 4,951,449 discloses a convertible lawn mower including a chute which can be selectively blocked with a chute plug to selectively put mower in a mulching mode.

U.S. Pat. No. 4,916,889 discloses a towed mower having a rectangular frame and a pair of diagonally related blades and the frame provide two different mowing width depending on from which side the frame is towed.

U.S. Pat. No. 5,163,275 discloses a pivoting handle mounting arrangement for lawn mower which includes an improved releasable and reversible handle assembly.

U.S. Pat. No. 474,458 discloses a tow hitch for use with a tractor having one or more lawn mower to increase the width of a cut area for each cycle.

U.S. Pat. No. 4,326,370 discloses a rotary lawn mower including a housing having a discharge port which can be blocked for use as a mulching mower as well as having a releasable chute or a bag for receiving grass.

U.S. Pat. No. 3,797,213 discloses a rotary power-operated lawnmower with an upstanding handle pivotally supported on the deck for reversal or flip over movement to facilitate opposite directional motion.

SUMMARY OF THE INVENTION

Present invention improves weed and grass mowers, hereafter lawn mowers, which has a power source such as an electric motor or a gasoline engine and has a rotational blade which is powered by said power source to cut grass and weeds. Said power source provides power to the wheels of a self propelled lawn mower as well as the rotational blade. Present invention replaces separate lawn mowers for mulching, side discharge, and rear bag collection into one multifunctional recycling lawn mower. Said multifunctional lawn mower consists of a multifunctional shell and a rotational blade and a handle. Said multifunctional shell is used for in situ recycling and discharge and rear bag collection of grass and weed clippings by incorporating variables of rotary direction of the rotational blade and direction of said multifunctional shell. Said multifunctional shell has a front section and an end section and in between has center section preferably under which said rotational blade is connected to said multifunctional shell. Said multifunctional shell is moved and controlled by using said handle which is connected to said shell using shell connectors. Said multifunctional shell functions as a recycling mower when moved in the direction of front section and functions as a discharge and rear bag collection mower when moved in the direction of end section.

DETAILED DESCRIPTION OF THE PREFERRED EMBODIMENTS

Figure 1:
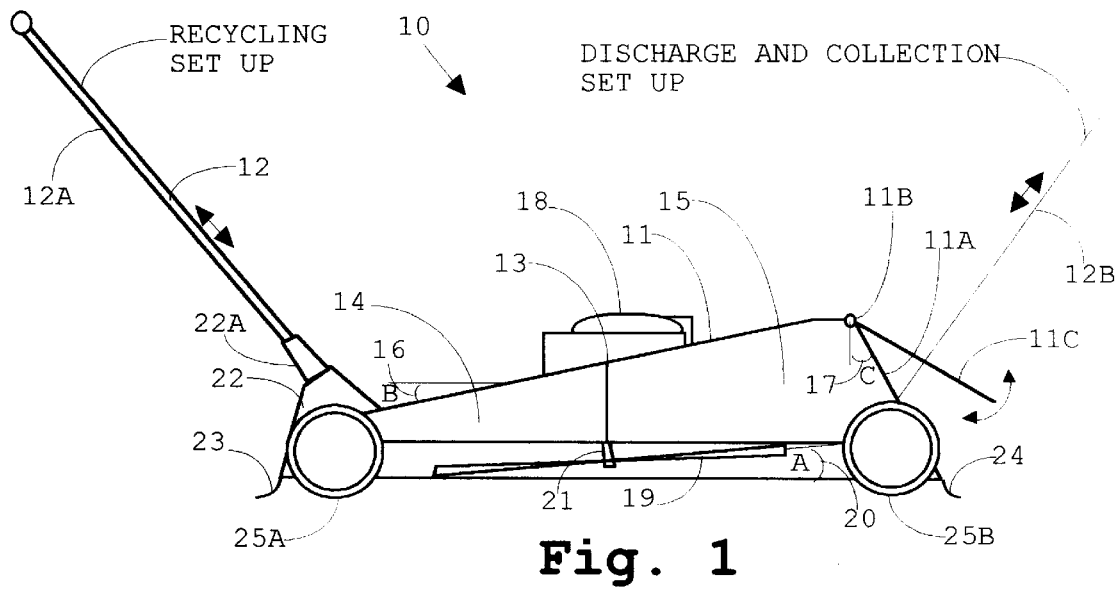
FIG. 1 is a side view of a multifunctional lawn mower showing multifunctional shell and handle positioned at both recycling and discharge and collection positions.

FIG. 1 shows a side view of a multifunctional recycling lawn mower 10 including multifunctional shell 11 and a handle 12 which is positioned at plane 12A to operate as a recycling lawn mower and positioned at 12B to operate as a discharge and collection lawn mower. Said handle is preferred to be adjustable in length. FIG. 1 also shows a center section 13 and an end distribution section 14 with an elastic end cover 23 and a front recycling and circulation section 15 with elastic front cover 24 of shell 11. Multifunctional shell 11 consists of two primary defining cross sectional angles of end angle 16 shown as B and front section angle 17 shown as C both of which said angles 16 and 17 are opposite of each other from the center 13 as shown in FIG. 1. A collection port 11A is covered by a collection port cover 11C using collection port connector 11B which connects said cover 11C to said shell 11 as shown in FIG. 1. A power source 18 is connected to multifunctional shell 11 and a rotary blade 19 is set at an angle of 20 shown as A relative to ground beneath said shell 11 as shown in FIG. 1. Said blade 19 is powered by said power source 18 using main power transmitter 21 which connects said rotary blade 19 and power source 18 as shown in FIG. 1. A shell connector 22 and a pair of shell connector guides 22A connect handle 12 and multifunctional shell 11 and secure said handle at desired positions 12A.

Figure 2:
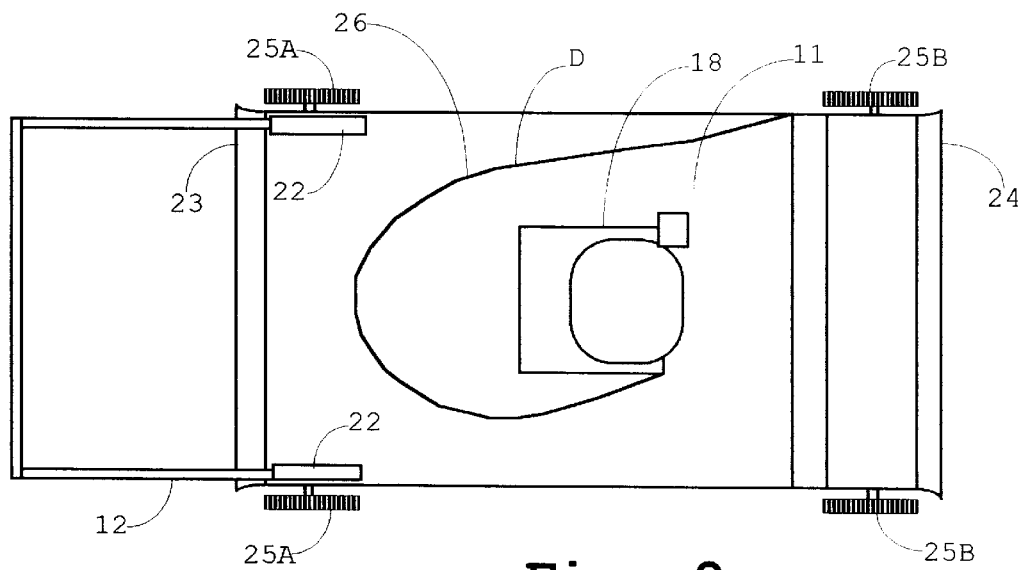
FIG. 2 is a top view of a multifunctional lawn mower showing multifunctional shell and wheels and handle positioned at both recycling and discharge and collection positions.

FIG. 2. shows a top view of a multifunctional recycling lawn mower showing a pair of wheels 25A and 25B connected multifunctional shell 11, and defining horizontal functional curve of 26 shown as D which shapes top of multifunctional shell 11 between angles 16 and 17.

Figure 3:
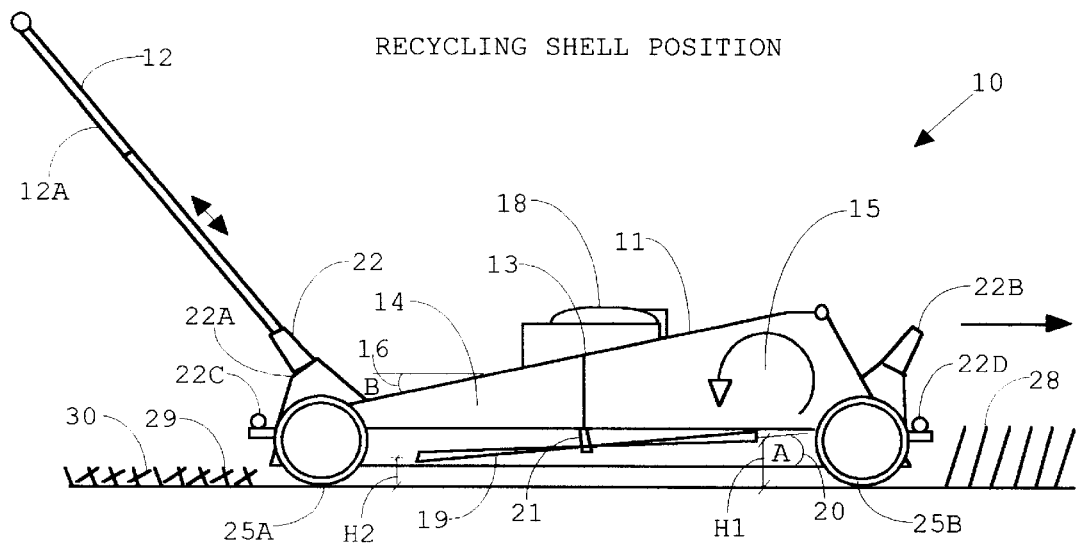
FIG. 3 is a side view of a multifunctional lawn mower showing multifunctional shell and blade set with an angle facing front section and multifunctional shell positioned to move in the direction of front section and handle positioned to move lawn mower in the direction of front section.
Figure 4:
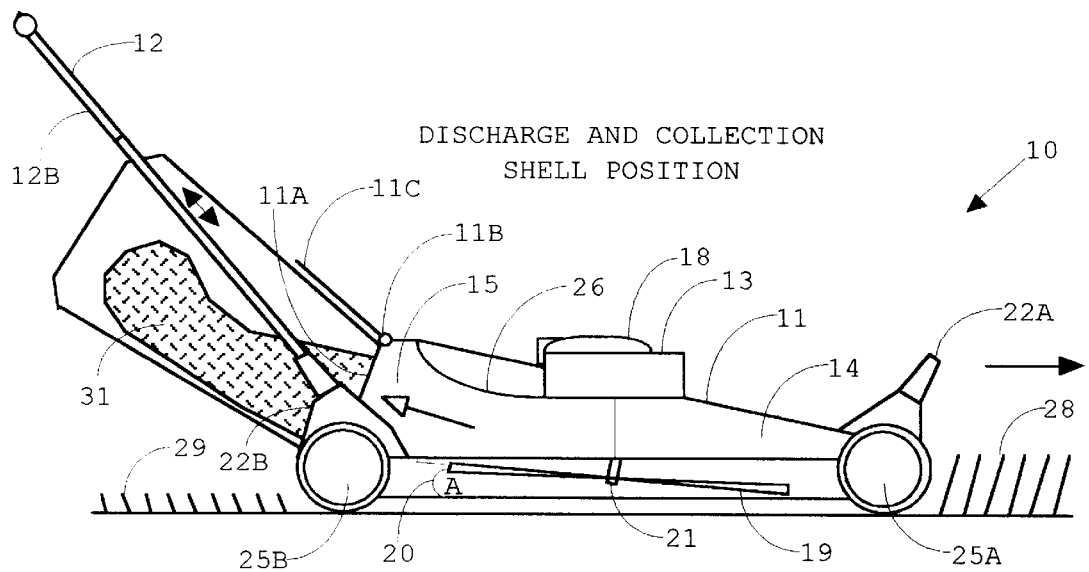
FIG. 4 is a side view of a multifunctional recycling lawn mower set with an angle facing front section and a handle and a multifunctional shell positioned to move in the direction of end section and a rear collection bag connected to multifunctional shell using discharge port.

FIG. 3 shows a multifunctional recycling lawn mower apparatus 10 to cut grass and to recycle cut grass clippings into the cut grass. Said multifunctional lawn mower 10 comprises of a multifunctional shell 11 having a front section 15 and a end section 14 in opposite sides from the center 13. Said shell 11 is moved forward in the direction of front circulation section 15 to function as a recycling mower as shown in FIG. 3 and moved forward in the direction of end distribution section 14 to function as a discharge and collection lawn mower as shown in FIG. 4. Both FIG. 3 and FIG. 4 show a rotary blade 19 connected to said shell 11 and may be set at an angle of 20 shown as A relative to ground beneath said shell 11. A power source 18 is connected to said shell 11 and powers said rotary blade 19 using main power transmitter 21. An adjustable handle 12 is connected to said main shell 11 using shell connector 22 and connector guides 22A. FIG. 3–4 show a and adjustable handle 12 positioned at 12A and 12B to move lawn mower 10 and its shell 11 in the direction of front section 15 and in the direction of end section 14 from the center 13 to function as recycling mower and bag collection mower respectively. A collection port 11A is connected to front section 15 of said shell 11 and a collection port cover 11C is connected to said collection port 11A using collection port connector 11B shown at open position while a collection bag 27 is connected to said shell 11 as demonstrated in FIG. 4. A collection bag 27 is connected to said shell 11 using said collection port 11A for discharge and collection of cut grass clippings 31. A shell connector 22 and shell connector guides 22A and 22B are connected to said multifunctional shell 11 and said handle 12 is secured said at desired positions of 12A and 12B as shown in FIG. 3 and FIG. 4 respectively. FIG. 3 shows power connectors 22C and 22D for towing and pushing said shell 11 and said power connectors connects said shell 11 with a power source designed to tow and push said shell 11 using 22A or 22B.

FIG. 3 also shows grass 28 being cut by multifunctional lawn mower 10 using rotary blade 19 cuts grass 28 in increments shorter and shorter from height of H1 down to H2 due to rotational direction of said blade 19 and horizontal shell angle 16 and vertical shell angle 17 and said blade angle 20 as said shell 11 moves forward. Cut grass clippings are circulated in front section 15 and is cut further depending on the speed of said shell 11 and rotational direction and velocity of said blade 19 before discharged from end section 14 into to cut grass 29 in the form of recycled cut grass 30.

FIG. 4 shows grass 28 being cut by multifunctional recycling lawn mower 10 using rotary blade 19 set at without or with an angle of 20 which cuts grass 28 as shell 11 moves forward by manually using handle 12 or by wheels 25B powered by power source 18. Cut grass clippings are moved to front section 15 from end section 14 before discharged to collection bag 27 through collection port 11A and collected in the form of grass clippings 31 and cut grass 29 is left free of grass clippings. Collection bag 27 is connected to shell 11 using collection port 11A by means of opening collection port cover 11C using collection cover connector 11B as shown in FIG. 4.

FIGS. 1–4 show a combination of variables including blade angle 20, defining horizontal shell angle 16 and vertical shell angle 17 of section 15, and a functional shell curve 26. Functional shell curve 26 connects said vertical angle 17 and horizontal angle 16 in both horizontal and vertical dimensions all of which define the shell 11 to work as a function of direction of shell 11. Above mentioned variables in aggregation and combination result in a multifunctional shell which functions as a recycling lawn mower when said shell 11 is set to move in the direction of front circulation section of 15. Said recycling lawn mower cuts grass clippings further received from front circulation section 15 and distribute cut grass clippings 30 into the grass 29 through end distribution section 14 without visible lumps of cut grass clippings on the grass 29. Therefor, cut grass clippings are distributed evenly and recycled into the grass using said multifunctional shell.

Figure 5:
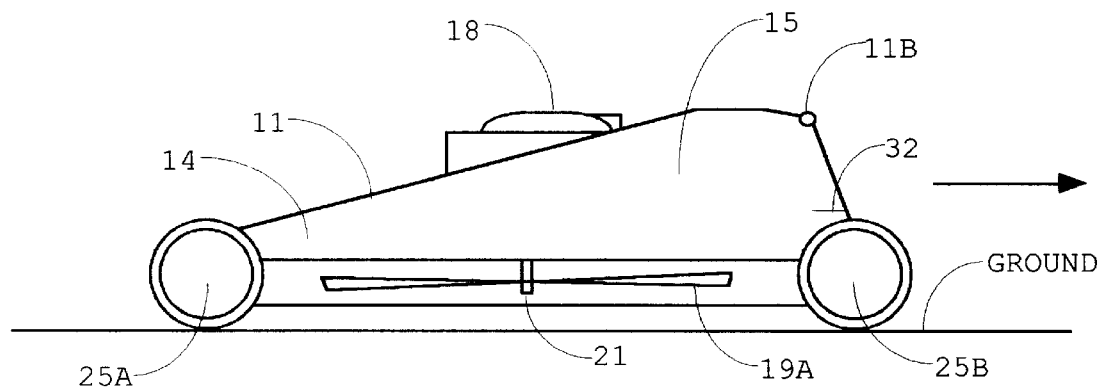
FIG. 5 is a side view of a multifunctional recycling lawn mower set with no angle and multifunctional shell positioned to move in the direction of front section and handle positioned to move lawn mower in the direction of front section.
Figure 6:
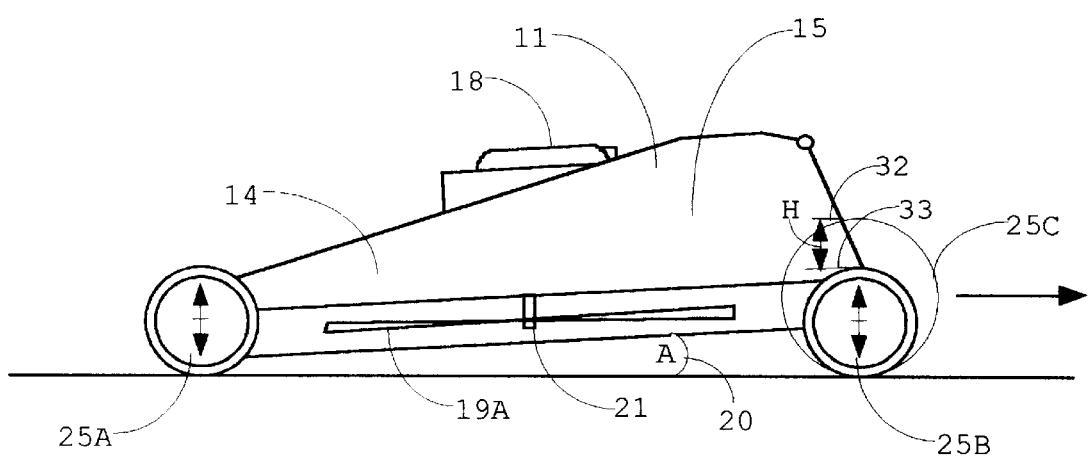
FIG. 6 is a side view of a multifunctional recycling lawn mower set with an angle facing front section using wheel height adjustments and multifunctional shell positioned to move in the direction of front section using handle.

FIG. 5 shows a side view of a multifunctional recycling lawn mower 10 including rotational blade 19A which is positioned parallel to the ground and set with no angle relative to ground. Multifunctional shell 11 positioned to move in the direction of front section 15 and handle 12 is also positioned to move lawn mower in the direction of front section 15. FIG. 6 shows two alternatives through which an angel of 20, shown as A, is established using adjustable same size pairs of wheels 25A and 25B. Front section 15 of multifunctional shell 11 is raised to level 33 from level 32 by H using wheel adjustments as shown in FIG. 6 to achieve angle 20. Same angle of 20 can be achieved by using a larger wheel 25C which is larger in diameter by H corresponding level 32. Therefore a combination of wheel adjustments and different wheel sizes in diameter can be used to establish a desired angle of 20, shown as A in FIG. 5–6.

Figure 7:
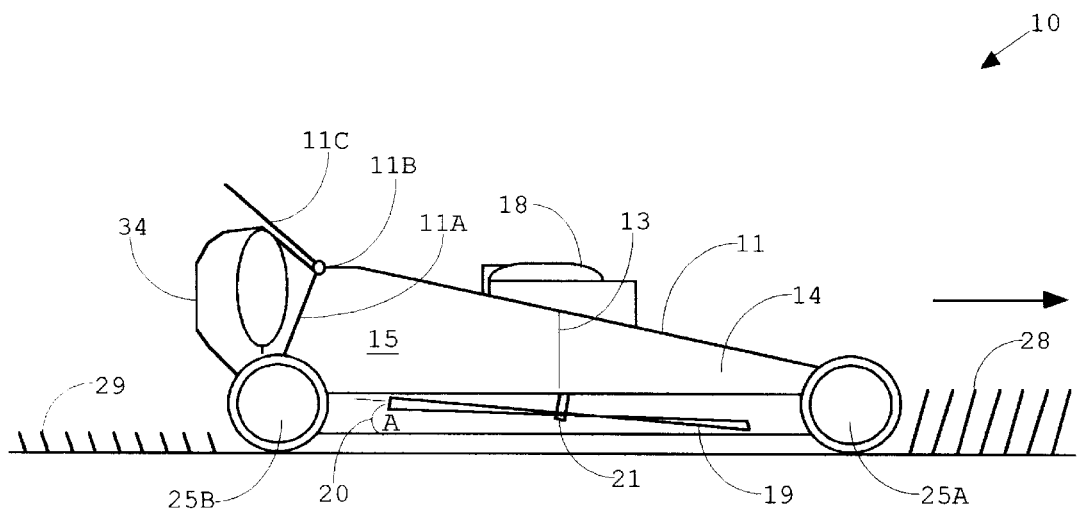
FIG. 7 is a side view of a multifunctional recycling lawn mower and multifunctional shell positioned to move in the direction of end section and handle positioned to move lawn mower in the direction end section and secondary side discharge shell connected to multifunctional shell.
Figure 8:
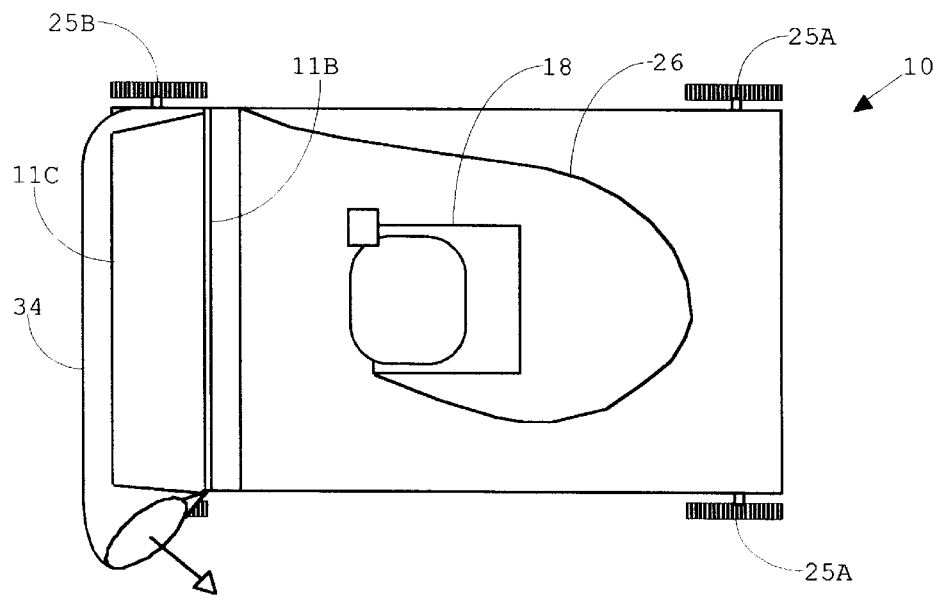
FIG. 8 is a top view of a multifunctional recycling lawn mower showing multifunctional shell positioned to move in the direction of end section and handle positioned to move lawn mower in the direction of end section and secondary side discharge shell connected to multifunctional shell.

FIG. 7 and FIG. 8 show a side and top view of multifunctional shell 11 positioned to function as a side discharge lawn mower including rotational blade 19 set with an angle 20 shown as A facing front section 15. Multifunctional shell 11 is positioned to move in the direction of end section 14 and handle 12 positioned to move lawn mower in the direction of zone of end 14. A secondary discharge shell 34 is connected to said multifunctional shell 11 using collection port 11A. Collection port 11A is opened using collection port cover 11C and port cover connector 11B. Port cover connector 11B is preferred to be rotational and connected to 11C and 11A. FIG. 7 also shows grass 28 is being cut by rotational blade 29 as multifunctional lawn mower 10 and its shell 11 moves forward in the direction of end section 14. Cut grass clippings are moved to front section 15 from end section 14 to be discharged through secondary discharge shell 34.

FIG. 8 shows a top view of a multifunctional recycling lawn mower 10 showing multifunctional shell 11 positioned to move in the direction of end section 14. A handle 12 is also positioned to move lawn mower 10 in the direction of end section 14 and secondary discharge shell 34 is connected to said multifunctional shell 11. Secondary discharge shell is utilized for side discharge of grass clippings.

The present invention incorporates variables of rotational blade angle 20, direction of multifunctional shell, and defined shape of multifunctional shell 11 using defining angles of 16 and 17 and curve 26 as shown in FIG. 1. Said variables give multifunctional lawn mower such as 10 unique ability to function as a recycling lawn mower and side discharge and bag collection lawn mower if moved in opposite directions from the center of said shell. This novel approach provides the following primary benefits and uses

- Ability to operate over overgrown long grass as a recycling lawn mower by means of cutting long grass in increments into short grass clippings which then is recycled into the cut grass and distributed uniformly,
- One lawn mower with no additional parts (except collection bag) is used for cutting grass for recycling and bag collection of grass clippings,
- Quality of end and cut length of grass clippings can easily be adjusted using the angle of the shell adjustments,
- Does not need conversion from collection mower to recycling mower except changing the direction of the lawn mower by means of using the same handle in two different set up positions,
- Same handle and same shell and same blade are utilized without modifications to function as a multifunctional lawn mower for recycling, side discharge, and bag collection.

While I have fully shown and described embodiments of multifunctional recycling lawn mower no limitations as to the scope of the present invention should be implied from the foregoing description. The true scope of the present invention is limited only by the following claims.

What is claimed is:

1. Multifunctional lawn mower to cut and recycle grass comprising:
    a multifunctional shell having a center and a front section and an end section in opposite sides from said center, said shell is moved forward in the direction of front section to function as a recycling mower and moved forward in the direction of end section to function as a discharge lawn mower,
    a power source connected to said shell,
    a rotary blade powered by said power source,
    a pair of wheels connected to said multifunctional shell,
    a pair of shell connectors attached to said multifunctional shell, and
    a handle attached to said multifunctional shell using said shell connectors.

2. Apparatus as set forth in claim 1 includes a shell connector guide connected to said shell connector to guide and secure said handle.

3. Apparatus as set forth in claim 1 includes a collection bag connected to said multifunctional shell using a collection port attached to said multifunctional shell for discharge and collection of the cut grass clippings.

4. Apparatus as set forth in claim 1 which includes a secondary discharge shell connected to said multifunctional shell.

5. Apparatus as set forth in claim 1 includes said wheels connected to said multifunctional shell and powered by said power source.

6. Apparatus as set forth in claim 1 includes said rotary blade connected to said shell and set at an angle as a function of the direction and the shape of said multi-directional shell relative to ground beneath said shell.

7. Apparatus as set forth in claim 1 includes said shell connectors connected to said shell, said connectors connect said shell with an external power source including a handle for manual operations.

8. Recycling lawn mower to cut grass and recycle said grass onsite comprising:
    a multifunctional shell having a center and a front circulation section and an end distribution section in opposite sides from said center, said shell is fixed to move forward in the direction of front circulation section to function as a recycling lawn mower,
    a power source connected to said shell,
    a rotary blade set with an angle and powered by said power source,
    at least two wheels connected to said multifunctional shell,
    a pair of shell connectors attached to said multifunctional shell.

9. Recycling lawn mower as set forth in claim 8 includes at least two primary angles comprising
    a horizontal shell angle horizontally defining said multifunctional shell, and
    a vertical shell angle vertically defining said front section of said multifunctional shell.

10. Recycling lawn mower as set forth in claim 8 which includes a handle connected to said multifunctional shell using said shell connectors.

11. Recycling lawn mower as set forth in claim 8 includes said wheels connected to said multifunctional shell powered by said power source.

12. Recycling lawn mower as set forth in claim 8 includes said blade set at an angle as a function of the direction and the shape of said multifunctional shell.

13. Recycling lawn mower as set forth in claim 8 includes said multifunctional shell set at an angle relative to the ground surface.

14. Recycling lawn mower as set forth in claim 8 includes at least one functional shell defining the shape of said multifunctional shell.

* * * * *